United States Patent
Jenkins et al.

[11] Patent Number: 6,017,145
[45] Date of Patent: Jan. 25, 2000

[54] EXTRUDER SCREW

[75] Inventors: Steven R. Jenkins, Sanford; Kun S. Hyun, Midland, both of Mich.

[73] Assignee: The Dow Chemical Company, Midland, Mich.

[21] Appl. No.: 08/366,526

[22] Filed: Dec. 30, 1994

[51] Int. Cl.[7] .................................................. A21C 1/06
[52] U.S. Cl. ............................. 366/79; 366/81; 366/90; 425/208; 425/209
[58] Field of Search ................... 366/79, 81, 90, 366/88, 89; 425/208, 209

[56] References Cited

U.S. PATENT DOCUMENTS

| | | | |
|---|---|---|---|
| 3,115,674 | 12/1963 | Schrenk et al. | 366/81 |
| 3,411,179 | 11/1968 | Gregory et al. | 425/209 |
| 3,687,423 | 8/1972 | Koch et al. | 366/81 |
| 3,850,414 | 11/1974 | Scharer | 366/89 |
| 3,858,856 | 1/1975 | Hsu | 366/88 |
| 3,946,998 | 3/1976 | Menges et al. | 366/90 X |
| 4,092,015 | 5/1978 | Koch | 366/81 |
| 4,128,341 | 12/1978 | Hsu | 366/89 |
| 4,131,368 | 12/1978 | Iddon | 366/81 |
| 4,152,077 | 5/1979 | Hold et al. | 366/90 |
| 4,173,417 | 11/1979 | Kruder | 366/89 |
| 4,213,710 | 7/1980 | Hold et al. | 366/81 |
| 4,277,182 | 7/1981 | Kruder | 366/89 |
| 4,330,214 | 5/1982 | Willert | 366/78 |
| 4,341,474 | 7/1982 | Wheeler, Jr. et al. | 366/88 |
| 4,355,905 | 10/1982 | St. Louis et al. | 366/79 |
| 4,678,339 | 7/1987 | Peiffer et al. | 366/77 X |
| 4,840,492 | 6/1989 | Nakamura | 366/81 |
| 4,963,033 | 10/1990 | Huber et al. | 366/89 X |
| 5,033,860 | 7/1991 | Nakamura | 366/90 X |
| 5,267,788 | 12/1993 | Rockstedt | 366/90 X |
| 5,288,233 | 2/1994 | Toro | 366/90 X |

*Primary Examiner*—Patrick Brinson
*Attorney, Agent, or Firm*—Nemia C. Damocles

[57] ABSTRACT

An extruder screw for use in a barrel of an extruder for forwarding thermoplastic polymer from a first end to a second end of the extruder. The extruder comprises a transition section and at least one flight extending substantially along the length of the screw. A dam is positioned at the point where the rapid melting of the solids starts to slow down and the rate of solid bed width decrease approaches zero. The dam provides the screw with a high output of extrudate and close control of the residence time of polymer particles as they are transported through the screw, resulting in an extrudate which is uniformly melted and which is substantially free of degradation products and/or entrapped air.

16 Claims, 3 Drawing Sheets

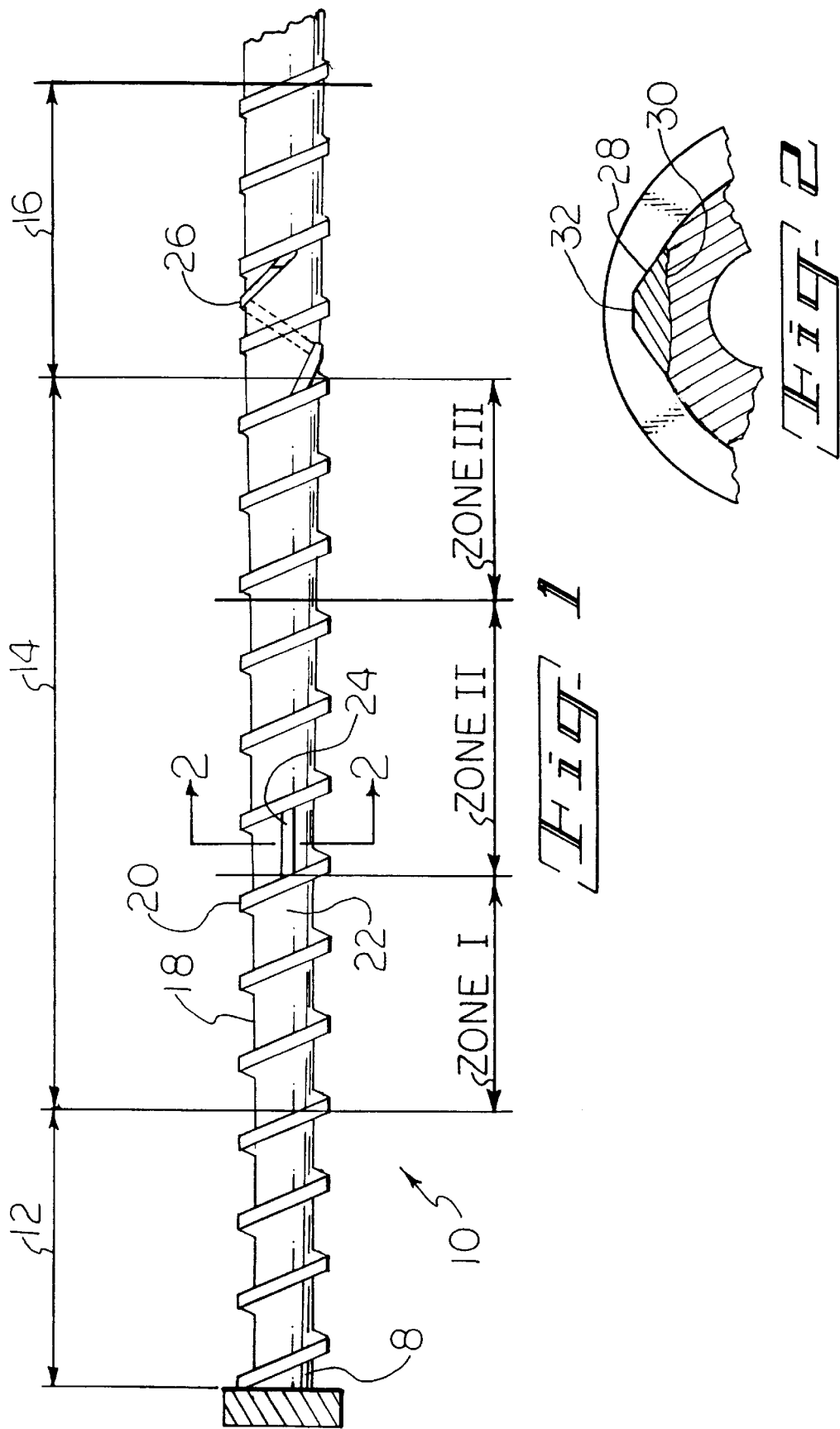

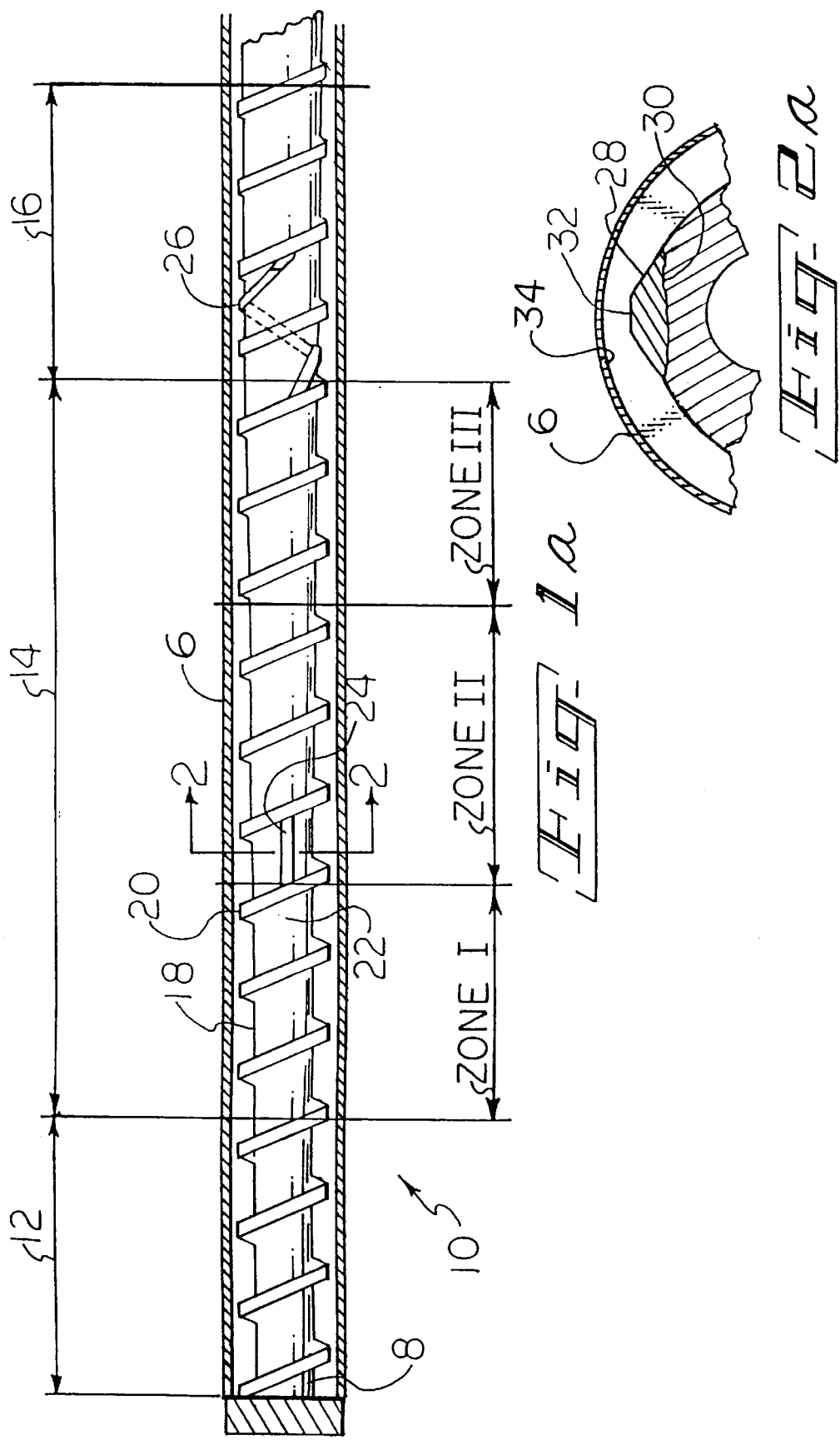

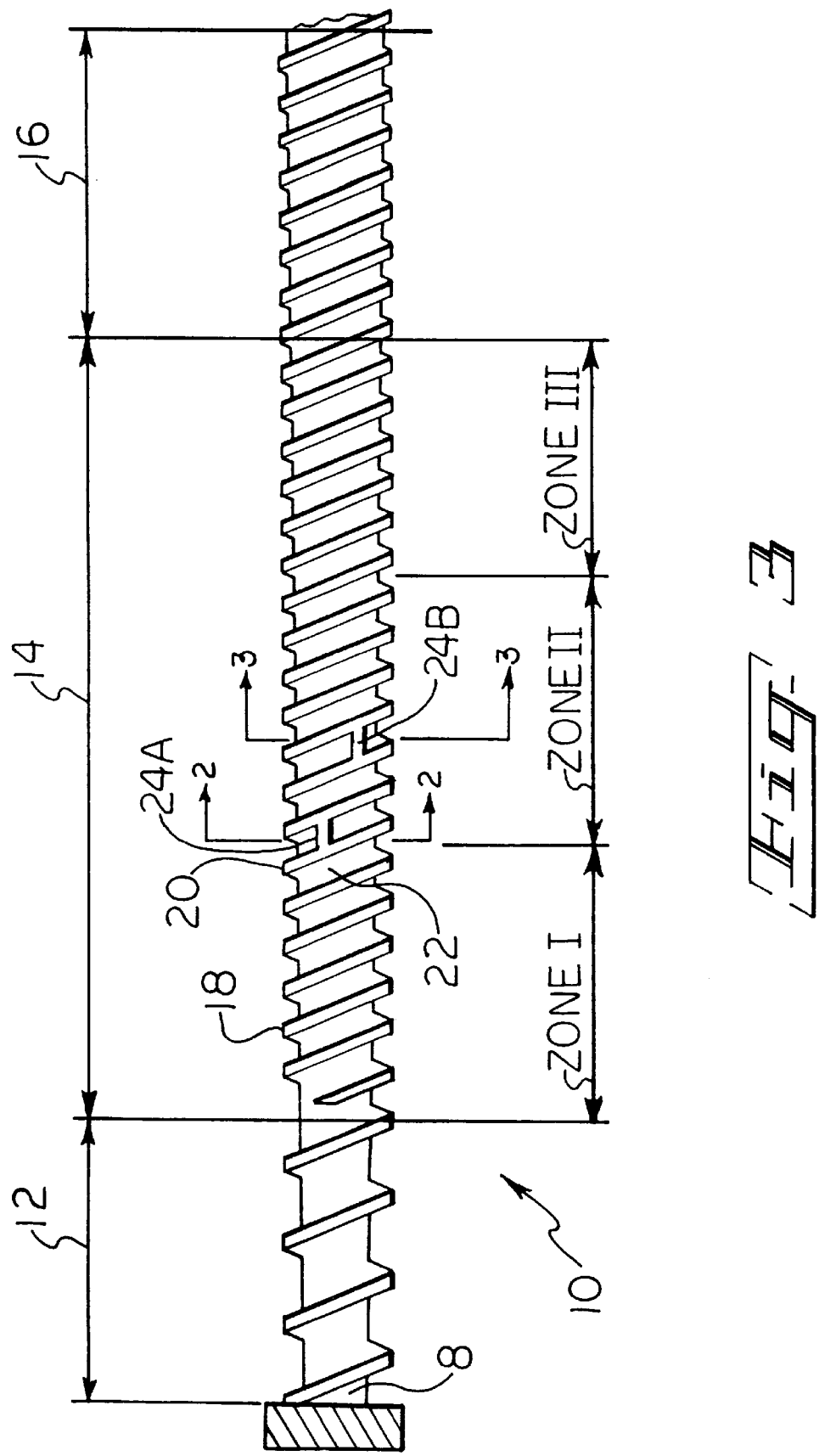

EXTRUDER SCREW

FIELD OF THE INVENTION

This invention relates to an extruder screw, and more particularly to a screw for use in an extruder for plasticating thermoplastic polymer. The invention further relates to improvements in the design of high output vinylidene chloride polymer (PVDC) of vinyl chloride polymer (PVC) plasticating extruder screws having controlled feed characteristics.

BACKGROUND OF THE INVENTION

A typical extruder screw comprises a root and a single flight helically extending about the root. The flight forms with the interior cylindrical surface of the barrel a helical channel along which the thermoplastic polymer is conveyed. The screw typically has a feed section, a tapered transition section and a metering section. The feed section is for conveying bulks of raw unmelted polymer from the hopper into the barrel. The tapered transition section is to compensate for the volume decrease as the bulk polymer is compressed and to force the polymer tight against the barrel inner wall for good heat conduction and efficient melting by mechanical shearing. Typically, the polymer begins to melt in the transition section. The necessity for good compaction is especially important in this transition section of the screw to ensure uniform melting of the polymer. The metering section is for advancing the melted polymer to the discharge end of the extruder.

The raw unmelted thermoplastic polymer, typically in the form of powders, pellets, or flakes, is introduced into the feed section of the screw and is advanced along the screw by means of the rotation of the helical flight on the screw. As the solids enter the transition section from the feed section, the solids begin to melt due to the heat created by frictional heat from the rotation of the screw and conductive heat from the heating element on the barrel.

During the course of movement of the solids through the extruder, the solids which are in contact with the hot barrel begin to melt, either by frictional heat or by heat conduction or by both, forming a melt film which adheres to the inner surface of the barrel, and the solids which are not in contact with the hot barrel remain as a solid mass. When the thickness of the melt film exceeds the clearance between the barrel and flight, the leading edge of the flight scrapes the melt film off the inner surface of the barrel and collects it at the forward or leading edge of the flight, forming a pool of the melted polymer. As the solids continue to melt, the width of the pool of melted polymer increases, while the width of the solid mass, normally referred to as the solid bed, decreases, resulting in the breakup of the solid bed into clusters of floating solids in a stream of melted polymer. When this happens, only a small portion, or none of the solid mass is exposed to the barrel and heat must travel from the barrel through the pool of melted polymer to reach the solid mass. As a result, the melting efficiency is greatly diminished once the solids bed is broken up due to the very low thermal conductivity of thermoplastic polymer.

In the extrusion of PVDC resins, the temperature of the polymer melt film near the barrel surface increases rapidly in the early part of the transition section as the compacted solid is forced into the reduced volume of the transition section. This melt film can reach temperatures that will cause localized degradation and subsequent bubbles and dark parabolic lines in a wavy pattern in the film. The temperature buildup is directly related to the peripheral velocity of the polymer at the barrel surface and the pressure generated at this point. The degradation generally occurs in the early part of the transition section where the large compacted solids surface area is rapidly being compressed, thus generating high pressure.

The current solution to this problem is to build low compression screws (compression ratios of less than 3.1) and install dams (restrictions) at the entrance to the metering section or end of the transition section. As used herein, the term "compression ratio" refers to the ratio of feed section flight depth to metering section flight depth. The purpose of such dams, which could extend between a plurality of screw flights, is to restrain and hold back insufficiently or nonuniformly melted polymer particles. An example of such a screw with a dam is shown in the figures of U.S. Pat. No. 3,115,674 to Schrenk et al. These designs have been successful in extruding virgin PVDC resins at high output rates (about 300 pounds per hour) with 3.5 inch diameter screws, but unsuccessful in extruding mixtures of virgin PVDC in powder feed form and a minor amount of PVDC film scraps (recycle).

The film scraps, which are typically compacted into thin flat disks (approximate dimensions of 0.25"× 0.35"×0.075") float within a stream of spherical powder particles (approximately 220 micrometers in diameter). These film scrap particles, typically only 5% to 10% by weight of the total resin, have a narrower melting peak than the surrounding powder (because they have been melted once already) and also have the tendency to congregate in the center of the solid bed in the screw. This narrower melting point and the recycles being in the center of the solid bed where they cannot receive viscous heat from the barrel/polymer interface, lead to delayed melting of the recycled polymers and subsequent unmelted polymer (gels) being present in the final film article.

It would be desirable to provide an extruder screw which has a high output of extrudate but which also provides close control of the residence time of polymer particles containing minor amounts of recycled resins as they are transported through the screw, resulting in an extrudate which is uniformly melted and which is substantially free of degradation products and/or entrapped air.

SUMMARY OF THE INVENTION

In one aspect, the present invention is an extruder screw for use in a barrel of an extruder for forwarding at least one thermoplastic polymer from a first end to a second end of the extruder comprising a transition section, said extruder screw comprising at least one flight, wherein one flight extends substantially along the entire length of the extruder screw and forms a spiral channel through which the polymer is transported; and a dam positioned at the point where the rapid melting of the solids starts to slow down and the rate of solid bed width decrease approaches zero.

In another aspect, the present invention is an extruder screw for use in a barrel of an extruder for forwarding at least one thermoplastic polymer from a first end to a second end of the extruder comprising:

a feed section, a transition section, and a metering section, said extruder screw comprising at least one flight, wherein one flight extends substantially along the entire length of the extruder screw and forms a spiral channel through which the polymer is transported; and a dam positioned at the point where the rapid melting of the solids starts to slow down and the rate of solid bed width decrease approaches zero.

It has been found that by providing a dam at the point where the rapid melting of the solids starts to slow down and the rate of solid bed width decrease approaches zero, that the screw can have a high output of an extrudate which is uniformly melted and substantially free of gels and/or entrapped air. The screw design of the present invention increases the melting rate through control of the solid bed width and depth while minimizing excess viscous heating. It has also been found that the addition of the dam reduces pressure buildup at the early part of the transition section by reducing the amount of solids conveyed by the feed section to the transition section.

BRIEF DESCRIPTION OF THE DRAWINGS

FIG. 1 is a side view, in elevation, of a typical single flight screw showing the position of the dams of the present invention;

FIG. 1a is a side view, in elevation, of a typical single flight screw inside an extruder barrel, showing the position of the barrel and the position of the dams of the present invention.

FIG. 2 is a cross-sectional view taken along line 2—2 in FIG. 1.

FIG. 2a is a cross-sectional view taken along line 2—2 in FIG. 1a.

FIG. 3 is a side view, in elevation, of a typical double flight screw showing the position of the dams of the present invention.

DETAILED DESCRIPTION OF THE INVENTION

The present invention is applicable to any conventionally designed extruder screw including single flight screws, such as one, two and three section screws; and multi-flight screws, such as double flight screws. Additionally, the present invention may be utilized to control the characteristics and residence times of a variety of thermoplastic polymers and copolymers, e.g., polyethylene, polypropylene, polyvinylidene chloride, polyvinyl chloride, and poly(ethylene vinyl alcohol). The present invention is particularly useful in controlling the characteristics and residence times of virgin vinylidene chloride polymer resins containing a minor amount of recycled vinylidene chloride polymer resins.

Referring now to FIG. 1a, there is illustrated an extruder screw generally indicated at 10, comprising a barrel 6, a feed section 12, a transition section 14 and a metering section 16. As shown, transition section 14 is divided into three lengthwise zones of substantially equal lengths comprising an early transition zone (Zone I), a mid transition zone (Zone II) and a late transition zone (Zone III). The early transition zone starts where the feed section ends, and the late transition zone ends where the metering section begins. The mid transition zone begins where the early transition zone ends and the late transition zone begins where the mid transition zone ends. In FIG. 1 the extruder screw is shown as having a screw of the "single flight" type and includes a root 18 and a single flight 20 which traverses the length of the extruder screw. As shown, the single flight has a constant diameter and pitch. However, it will be recognized that screw flights having varying pitches may be utilized in the practice of the present invention. The single flight forms a spiral channel 22 through which the polymer is transported. A dam 24 is positioned to extend across channel 22 which is formed by adjacent flights 20.

In FIG. 3, the extruder screw is shown as having a screw of the "double flight" type and includes flights 18 and 20. Flight 18 is behind flight 20 and forms a channel behind flight 20. Dam 24a and 24b are positioned to extend across the channel formed between flights 18 and 20.

Preferably, additional dams are added downstream from dam 24. For example, one or more dams can be inserted between adjacent flights in a single flight screw throughout the length of transition section 14, preferably at the end of transition section 14 or at the beginning of metering section 16. The additional dams can ensure the completeness of melting without the risk of overshearing and heating.

Generally, the extruder screw has a low compression ratio. Preferably, the extruder screw has a compression ratio of less than 3.5, more preferably less than 3.3 and most preferably 3.0.

In the operation of the extruder screw shown in FIG. 1, the raw unmelted thermoplastic powders, pellets, or flakes (hereinafter called solids), are introduced into the feed section 12 where they are heated by frictional heat generated at the barrel surface to a temperature which is sufficient to form a thin film of melted polymer on the surface of barrel 6. The thin film is not thick enough to be picked up by flight 20 at this point. As the solids continue their travel from the feed section 12 to the transition section 14, the thin film of melted polymer creates a drag on the unmelted polymer whereby the unmelted polymer are packed in the rear of channel 22.

As melting continues, the thickness of the film of melted polymer on the inner surface of the barrel increases until it can be scraped off by the leading edge of flight 20. Flight 20 collects the melted polymer at the forward or leading edge of the flight, forming a pool of the melted polymer. Heat now enters the pool of melted polymer by the shearing action whose energy is derived from the turning of the screw, resulting in the rapid melting of the solids. As the solids continue their travel from Zone I into Zone II of the transition section, the width of the pool of melted polymer increases, while the width of the unmelted polymer mass, normally referred to as the solid bed, decreases until the rate of decrease approaches zero. When the rate of decrease of the solid bed width approaches zero, the rapid melting of the solids starts to slow down. While not wishing to be bound by theory, it is believed that this phenomenon occurs due to the dissipation of heat from the pool of viscous melted polymer into the barrel which is at a lower temperature than the pool of melted polymer.

It has been found that the solids melting rate can be increased by inserting a dam 24 across channel 22 within transition section 14. It has been found that the insertion of dam 24 increases the solid bed width and decreases the solid bed depth. The increased solid bed width increases the melting rate of the solids and the decreased solid bed depth allows heat from the melted solid to more quickly reach the compacted solids located in the center of the solid bed.

It has also been found that the addition of the dam reduces the pressure buildup at the beginning of the transition section. The pressure buildup is caused by the greater amount of solids conveyed by the feed section into the transition section than the amount of melt the metering section can pump out from the transition section. The insertion of the dam at the mentioned location helps balance the solids conveying and melt pumping capabilities of the screw. The reduction of pressure buildup helps minimize excess rapid frictional heating which could lead to degradation of the PVDC.

The placement of dam 24 is critical. If the device is placed too early in the screw, the melting rate can actually be decreased. On the other hand, if it is placed too late in the screw, its effect on melting rate is negligible. The melting rate of the thermoplastic polymer in the screw depends a great deal on the amount of contact between the barrel and the polymer. To a lesser extent, this melting rate depends on a variety of other factors, including the heat transfer dynamics of the extruder and the type of thermoplastic material being extruded. In general, dam 24 is positioned at the point where the rapid melting of the solids starts to slow down and the rate of solid bed width decrease approaches zero. Preferably, dam 24 is positioned across any channel within the early transition zone (Zone I) and mid transition zone (Zone II) of the transition section. For illustrative purposes only, taking a SARAN™ polymer extruder screw having 18 to 26 channels (turns of the spiral channel) as an example, dam 24 is more preferably positioned across any channel starting from the last channel in Zone I to the third channel in Zone II and, most preferably, dam 24 is positioned in any one of the 9th, 10th, 11th or 12th channel (counting from pocket 8 of the extruder, as shown in FIG. 1) of the extruder screw.

Dam 24 is preferably positioned at an acute angle of 45 degrees or less from the long axis of screw 10, and most preferably is positioned substantially parallel to the long axis of the screw.

In general, the optimum dam height for a specific screw depends upon a number of factors such as the type of polymer being fed, specifically the Tg and crystallinity of the polymer; whether scrap pellets are added; the types of additives blended with the polymer, specifically slip additives and the like; the feed form of the polymer; and the number of dams employed within the scope of this invention. Dam 24 is generally from about 10% to about 60%, preferably from about 25% to about 55%, and most preferably from about 35% to about 50% of the height of flight 20. A dam height of greater than about 60% of the height of the flight has been found to result in excessive restriction to flow of the solid polymer, and a shortening of the rapid melting zone of the transition section. A dam height of less than about 10% of the height of the primary flight has been found not to be as effective in controlling the solid bed width, depth and solids conveying rate, compacting the polymer, and eliminating entrapped air in the polymer.

As shown in FIG. 2, dam 24 has a generally cam-shaped cross-section 28 with a wide base 30 and a flattened top portion 32. Generally, top portion 32 has a flat top which is at least about 0.1 inch long, preferably from about 0.125 inch to about 0.25 inch long, and most preferably about 0.2 inch long. The clearance between this flat top and the inner surface 34 of the barrel is critical. This clearance can have a significant effect on the melting rate and solids conveying performance of the screw. Preferably, this clearance is from about 10% to about 70%, more preferably from about 20% to about 60% and, most preferably, about 50% of the distance between the root channel and the barrel inner surface 34. This clearance which is relatively smaller compared to the clearance between the barrel surface 34 and channel 22, reduces the solids conveying rate of the screw, which in turn reduces the pressure buildup early in the screw by about 500 to about 1000 psi. This reduced pressure means less viscous heating and subsequently improved extrudate quality due to lower melt temperatures. This clearance also widens and reduces the solids bed depth without decreasing the length of the rapid melting zone of the transition section.

Dam 24 may be fabricated of any suitable material which is compatible with the polymers to be processed and which can withstand the processing temperatures encountered in the extruder. Additionally, it is preferable that the dam is fabricated of a material similar to that material used to fabricate the root 18 of the screw. For example, the dam may be fabricated of steel where the screw is designed to process polyethylene. Where vinylidene chloride copolymers are to be processed, preferably dam 24 is of a nickel alloy. Dam 24 may be welded or otherwise secured to root 18 of the extruder screw.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An extruder screw of the type for use in a barrel of an extruder for forwarding at least one thermoplastic polymer from a first end to a second end of the extruder comprising:

(a) a feed section wherein the polymer is introduced into the barrel and heated to a temperature sufficient to form a thin film of melted polymer on the inner surface of the barrel;

(b) a transition section wherein the polymer is melted by the heat created by frictional heat from the rotation of the screw and conductive heat from the barrel forming a mixture of melted and unmelted polymer;

(c) a root;

(d) at least one flight which extends helically about the root, wherein one flight extends substantially along the entire length of the extruder screw and forms a spiral channel through which the polymer is transported and which collects the melted polymer at its forward end, forming a pool of melted polymer; said transition section comprising an early transition zone (Zone I); a mid transition zone (Zone II) and a late transition zone (Zone III); wherein at the beginning of Zone I, melting of the polymer increases rapidly and the width of the pool of melted polymer increases while the width of the unmelted polymer (solid bed) decreases and, between the end of Zone I and the beginning of Zone II, the rate of decrease of the width of the solid bed approaches zero and the rapid melting of the solids starts to slow down;

(e) a metering section for advancing the melted polymer to the discharge end of the extruder; and (f) a dam positioned at the point where the rate of solid bed width decrease approaches zero and the rapid melting of the solids starts to slow down.

2. The extruder screw of claim 1 wherein said dam is inserted across any channel starting from the last channel in Zone I to the third channel in Zone II.

3. The extruder screw of claim 1 which comprises 24 to 30 channels, and the dam is inserted in any one of the 9th, 10th, 11th or 12th channel of the extruder screw.

4. The extruder screw of claim 1 wherein said dam is positioned in the 10th channel of the extruder screw.

5. The extruder screw of claim 1 wherein said dam is at an acute angle of 45 degrees or less from the long axis of said screw.

6. The extruder screw of claim 1 wherein said dam is substantially parallel to the long axis of said screw.

7. The extruder screw of claim 1 wherein said dam is substantially perpendicular to said flight.

8. The extruder screw of claim 1 wherein the height of said dam is from about 10% to about 60% of the height of said flight.

9. The extruder screw of claim 8 wherein the height of said dam is from about 25% to about 55% of the height of said flight.

10. The extruder screw of claim 9 wherein the height of said dam is from about 35% to about 50% of the height of said flight.

11. The extruder screw of claim 1 wherein said extruder screw comprises two flights extending substantially along the entire length of the extruder screw.

12. The extruder screw of claim 1 wherein said dam has a generally cam-shaped cross-section having a wide base and a flattened top portion.

13. The extruder screw of claim 12 wherein said flattened top portion has a clearance from the barrel inner surface of from about 10% to about 70% of the distance between the root and the barrel inner surface.

14. The extruder screw of claim 13 wherein said flattened top portion has a clearance from the barrel inner surface of from about 20% to about 60% of the distance between the root and the barrel inner surface.

15. The extruder screw of claim 14 wherein said flattened top portion has a clearance from the barrel inner surface of about 50% of the distance between the root and the barrel inner surface.

16. The extruder screw of claim 1 including at least one additional dam inserted at the end of said transition section.

* * * * *